United States Patent [19]

McClure

[11] Patent Number: 4,786,215

[45] Date of Patent: Nov. 22, 1988

[54] PORTABLE HYDRAULIC PUNCH

[75] Inventor: Richard R. McClure, Basehor, Kans.

[73] Assignee: Butler Manufacturing Company, Kansas City, Mo.

[21] Appl. No.: 92,366

[22] Filed: Sep. 2, 1987

Related U.S. Application Data

[62] Division of Ser. No. 896,194, Aug. 14, 1986, Pat. No. 4,731,929.

[51] Int. Cl.[4] .............................................. B26F 1/00
[52] U.S. Cl. .................................... 408/1 R; 30/360; 52/747; 83/33; 83/34; 83/50; 408/79
[58] Field of Search .................. 408/1 R, 79; 52/747; 83/33, 34, 39, 40, 50; 30/358–362; 29/163 SR

[56] References Cited

U.S. PATENT DOCUMENTS

| | | | |
|---|---|---|---|
| 1,231,438 | 6/1917 | Serpas | 408/79 |
| 2,776,712 | 1/1957 | Carlson | 83/33 X |
| 3,663,115 | 5/1972 | Vindez et al. | 408/79 |
| 3,924,330 | 12/1975 | Mitsuhashi et al. | 30/362 |

Primary Examiner—Gil Weidenfeld
Assistant Examiner—Steven C. Bishop
Attorney, Agent, or Firm—Shoemaker and Mattare, Ltd.

[57] ABSTRACT

An apparatus for punching a plurality of predetermined spaced mounting holes in a building roof panel support member includes an elongated housing having an oil sump therewithin, a hydraulic pump together with an electric motor for actuation thereof mounted on the housing, guide structure which can be opened and closed for temporarily mounting the housing upon a roof panel support member, an adjustable gauge pin mounted on the housing near one end thereof, the gauge pin being supported on a mount which is adjustable along both the length and the width of the housing, and a hydraulic punch adjustably mounted near the other end of the housing from the gauge pin for punching holes in the support member.

The method of punching holes in a roof panel support member as disclosed herein is also part of this invention.

5 Claims, 7 Drawing Sheets

PORTABLE HYDRAULIC PUNCH

This is a division of application Ser. No. 896,194 filed Aug. 14, 1986, now U.S. Pat. No. 4,731,929.

BACKGROUND OF THE INVENTION

1. Field of the Invention

This invention relates generally to apparatus for use in mounting roof panels upon a building under construction, and especially to an apparatus for punching a desired plurality of predetermined holes a desired distance apart.

2. Description of the Prior Art

In conventional building construction, roof panels are mounted thereupon by drilling a predetermined number of spaced holes along the building roof panel support joists. However, this requires the use of electric drills, the use of drill bits which quickly become either dull and/or broken, and thus require replacement thereof, and, of course, causes extreme worker fatigue in the drilling process. Another drawback of such conventional type construction is that oftentimes the spacing of the holes is not as accurate as necessary for desired proper roof construction.

Of course, hydraulic punch apparatus for punching various type holes in panels, beams, joists and the like are well known; however, none of the known devices are readily usable with roof panel support joists and the like, and thus are not practical for effecting proper roof construction.

Known patents which may be pertinent to the present invention are as follows:

| | | |
|---|---|---|
| Whitney | 1,180,357 | 4/25/16 |
| Westervelt | 2,374,400 | 4/24/45 |
| Von Hagel et al | 2,781,838 | 2/19/57 |
| Goodman | 3,344,519 | 10/3/67 |
| Brolund | 3,469,487 | 9/30/69 |
| Duffy | 3,892,154 | 7/1/75 |
| Mitsuhashi et al | 3,924,330 | 12/9/75 |
| Olsson | 4,088,048 | 5/9/78 |
| Beatty | 4,136,592 | 1/30/79 |
| Urbanski | 4,192,209 | 3/11/80 |
| Mori et al | 4,509,397 | 4/9/85 |

None of these known prior art devices offer the new and novel features of the present invention.

SUMMARY OF THE INVENTION

An object of the present invention is to provide apparatus for punching a plurality of holes in a roof panel support member, with the holes being spaced a desired predetermined distance apart.

Another object of the present invention is to provide an easily mountable/demountable hydraulic punch device for mounting upon a building roof panel support joist and to punch a predetermined spaced plurality of holes there along.

A further object of the present invention is to provide a hydraulic punch apparatus having a built-in oil sump, and hydraulic punching structure for quickly and effectively punching a predetermined spaced series of holes in a building joist.

A still further object of the present invention is the method of punching a plurality of spaced holes in a roof panel support beam with great accuracy of the desired spacing of these holes. The use of the apparatus of the present invention can optimize the method of this invention.

A still further object of the present invention is to provide a portable hydraulic punch having adjustable gauge structure therewith for accurately and easily adjusting the spacing of the holes to be punched thereby. Also, adjustable guide structure for retaining and affixing the portable punch apparatus upon a roof support joist is provided.

The present invention has a number of new and novel features. Among them is an elongated housing having a built-in oil sump, and a hydraulic pump mounted in said sump which is actuated by an electric motor attached thereto. The electric motor has a quick start operating button associated therewith for easy operation by a user of the device. A built-in hydraulic pressure maintaining valve is included in the hydraulic system so that minimum hydraulic pressure will always be retained in this system. The purpose of this is to provide quick start-up and quick punch operation when the electric button is depressed.

An adjustable gauge pin is mounted at one end of the elongated housing, with this pin being adjustable both lengthwise of the housing, as well as widthwise. This permits variation of the adjustment of the gauge pin in both the x and y axes. Of course, the gauge pin itself moves in the z axis. On the other end of the housing from the gauge pin is an adjustable hydraulic punch structure which includes a stripper and a replaceable punch, and a complementary die for the punch.

This apparatus offers complete portability, complete adjustability in all axes, and easy and accurate operation by a workman doing roof construction.

These together with other objects and advantages which will become subsequently apparent reside in the details of construction and operation as more fully hereinafter described and claimed, reference being had to the accompanying drawings forming a part thereof, wherein like numerals refer to like part throughout.

DESCRIPTION OF THE PREFERRED EMBODIMENT

Figure 1:
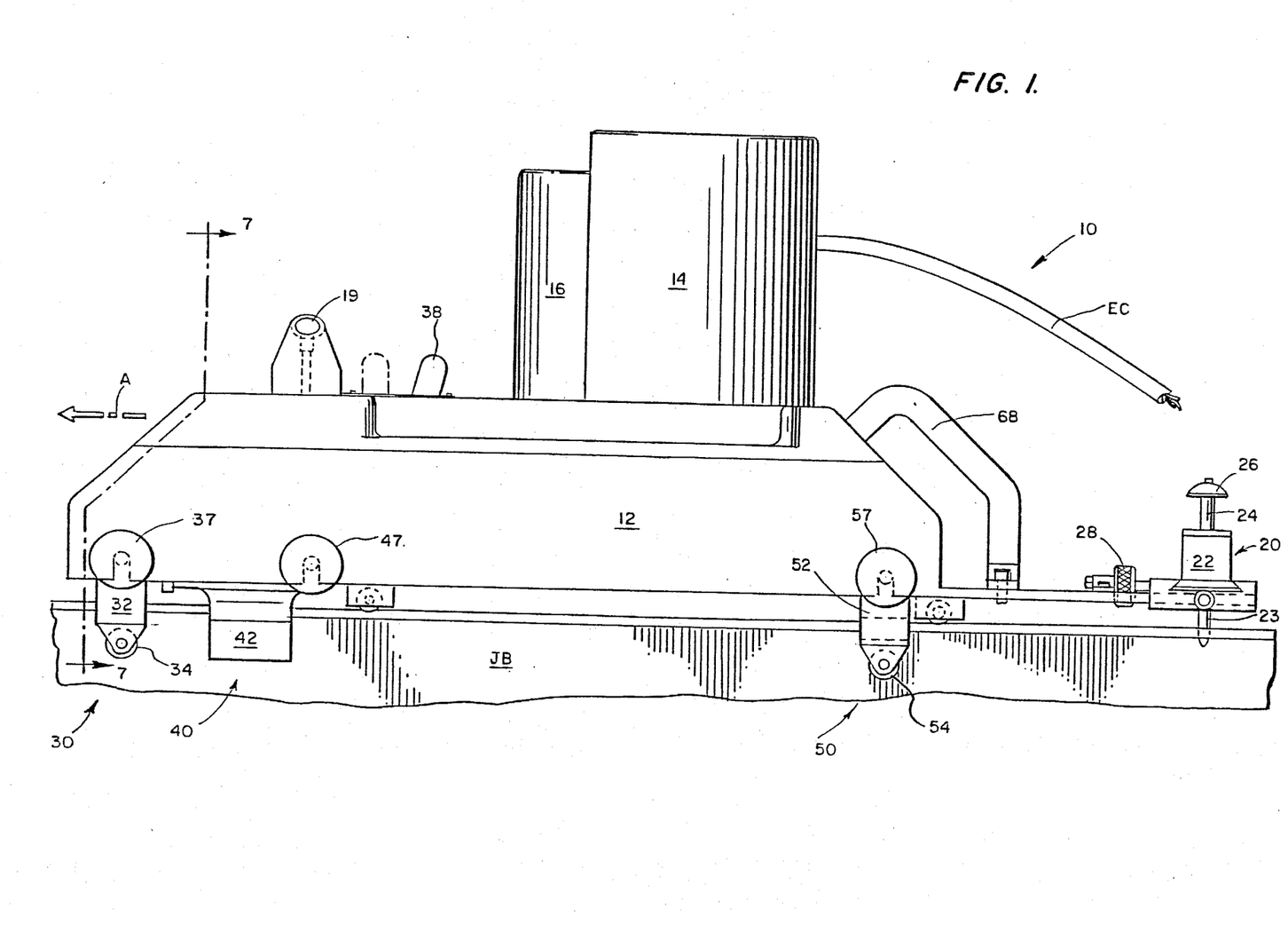
FIG. 1 is a side elevation of the apparatus of the present invention.
Figure 2:
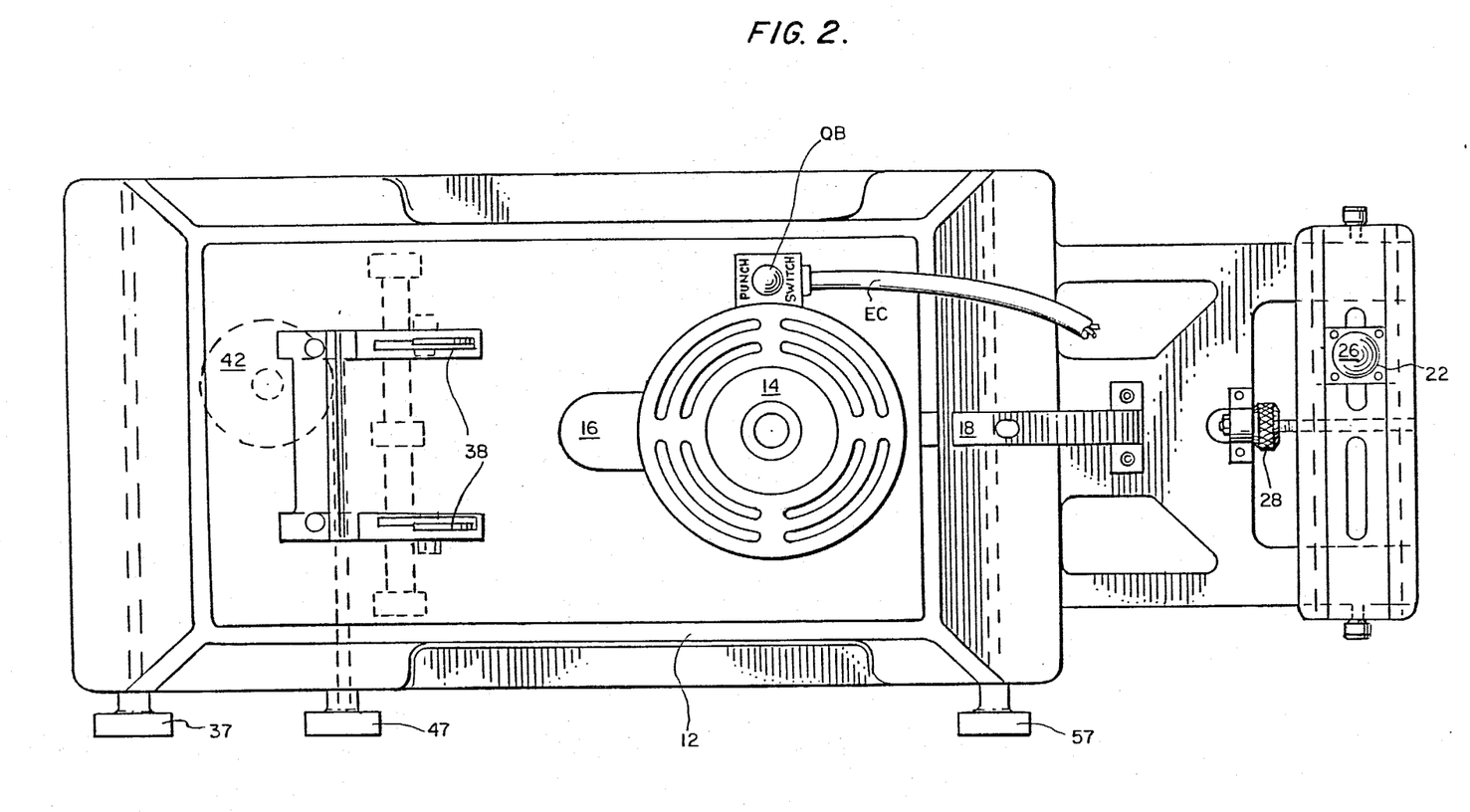
FIG. 2 is a top plan view of the apparatus of FIG. 1.
Figure 3:
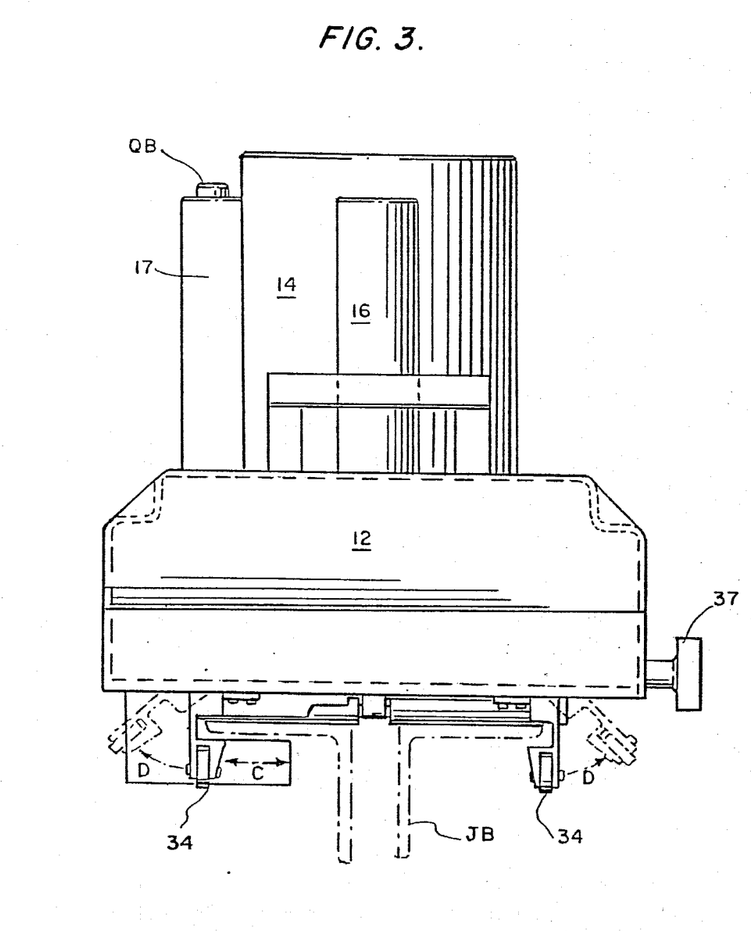
FIG. 3 is a front elevational view of the apparatus.
Figure 4:
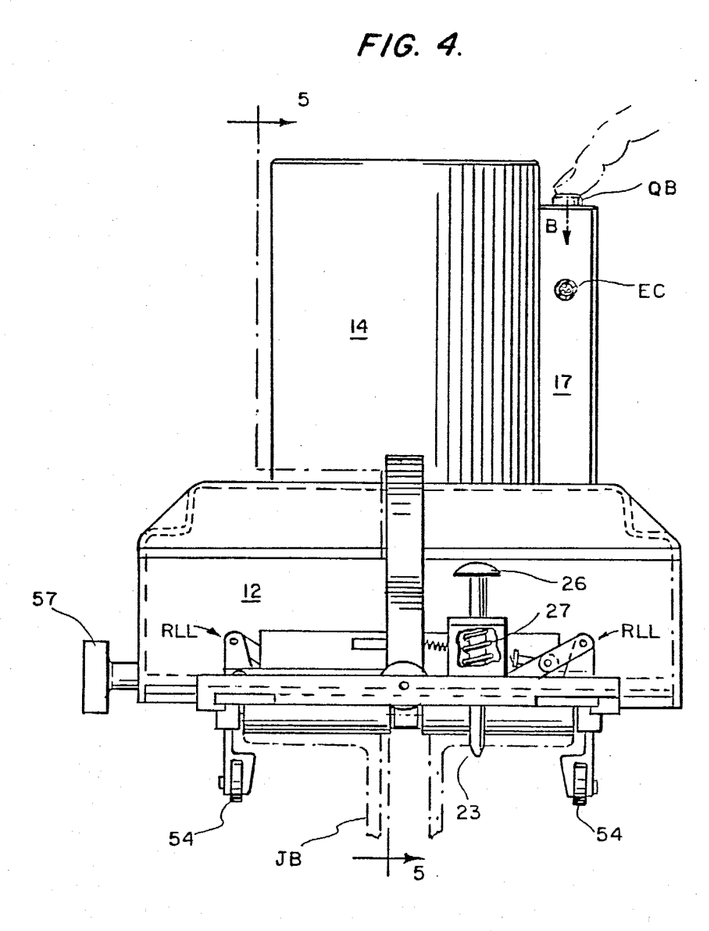
FIG. 4 is a rear elevational view of the apparatus.
Figure 8:
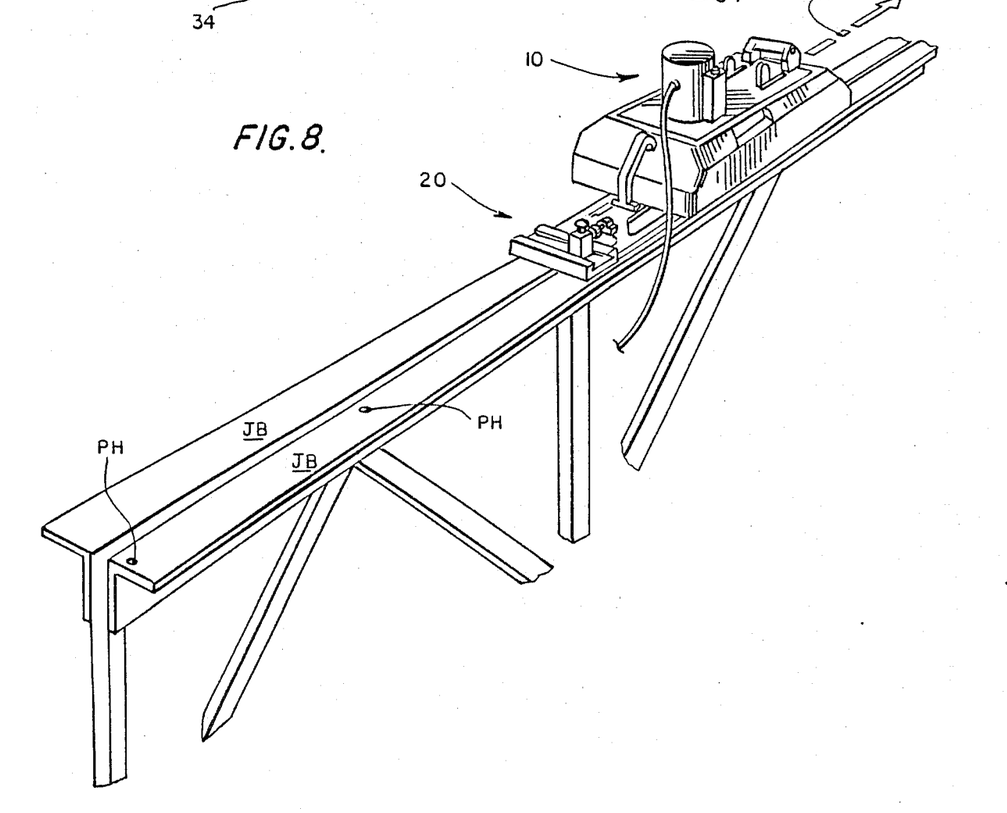
FIG. 8 is a perspective view of the apparatus of the present invention as in use.

Referring to FIGS. 1 and 8 of the drawings, reference numeral 10 indicates in general the portable hydraulic punch apparatus of the present invention. Reference numeral 20 refers in general to the adjustably mounted gauge pin structure of the present invention, while reference numeral 30 refers to the adjustable width front guide structure, reference numeral 40 refers to the hydraulic punch structure, and reference numeral 50 refers to the rear adjustable width guide structure.

The joist runner of the present invention includes an elongated rectangular housing 12, preferably of plastic material, having an oil sump in a substantial portion of the center thereof. An electric motor 14 having a start capacitor 16 therewith drives a hydraulic pump 18. The motor normally is mounted on a transparent cover TC so that the pump 18 extends into the oil in the oil sump. A support structure 17 has a quick start button QB mounted on the top thereof. A suitable hydraulic line HL is connected between pump 18 and the hydraulic punch 44. Preferably, a minimum pressure valve PV is connected in this line so that the oil pressure therein cannot drop below a certain given value. Such value is just below that required for the punch 44 to operate; thus, when the quick start button QB is pressed, the pump will quickly build up sufficient additional hydraulic pressure to effect a quick punch operation. Otherwise, without the pressure valve PV in the system, a lag time would always be present between the depressing of start button QB, energization of electrical motor 14 and buildup of hydraulic pressure in pump 18 and in line HL. By the use of this minimum pressure valve, such lag time is eliminated. An electric cord EC supplies the electrical power through suitable extension cords to electric motor 14.

Figure 6:
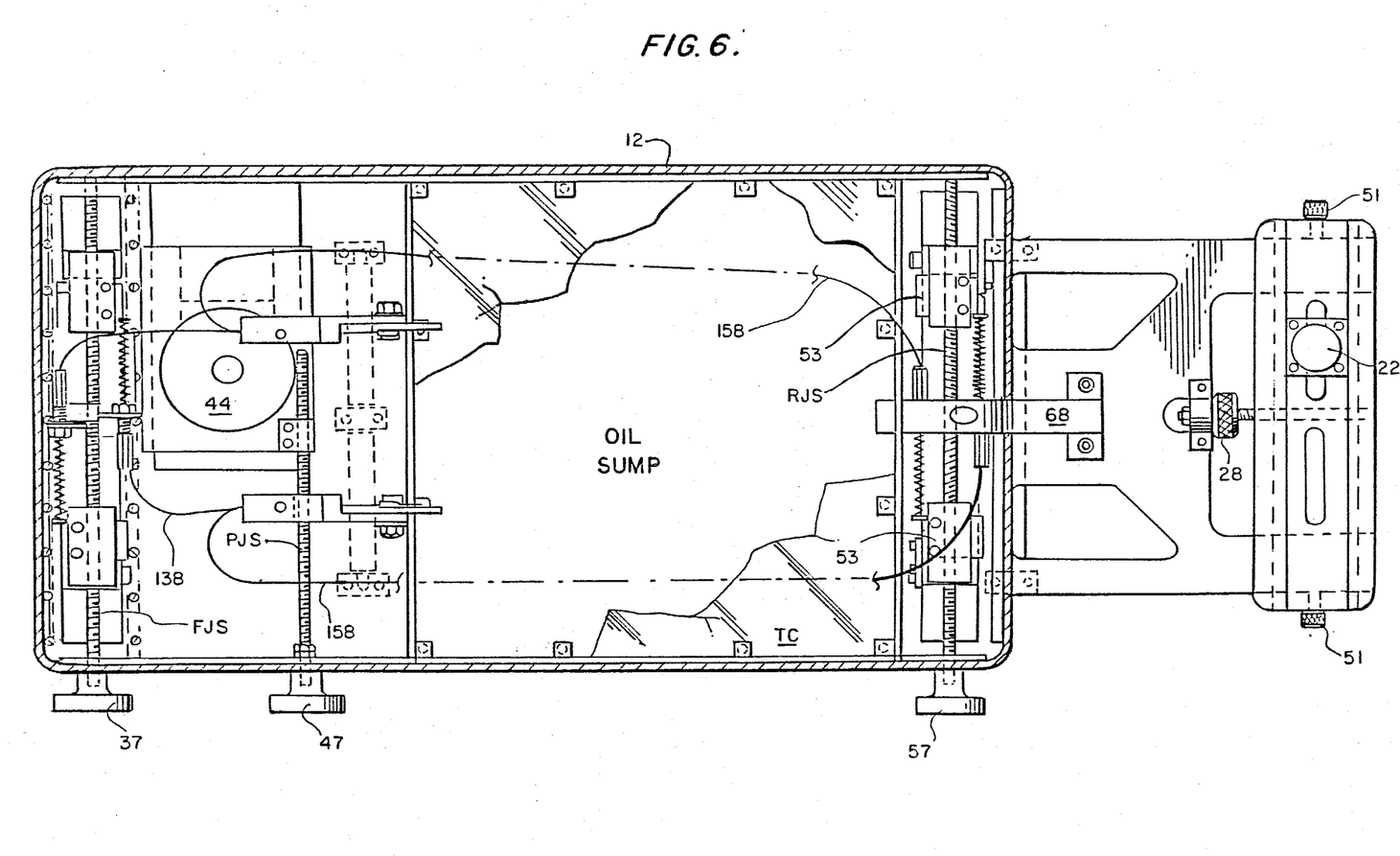
FIG. 6 is a horizontal cross-sectional view taken generally along line 6—6 of FIG. 5.
Figure 7:
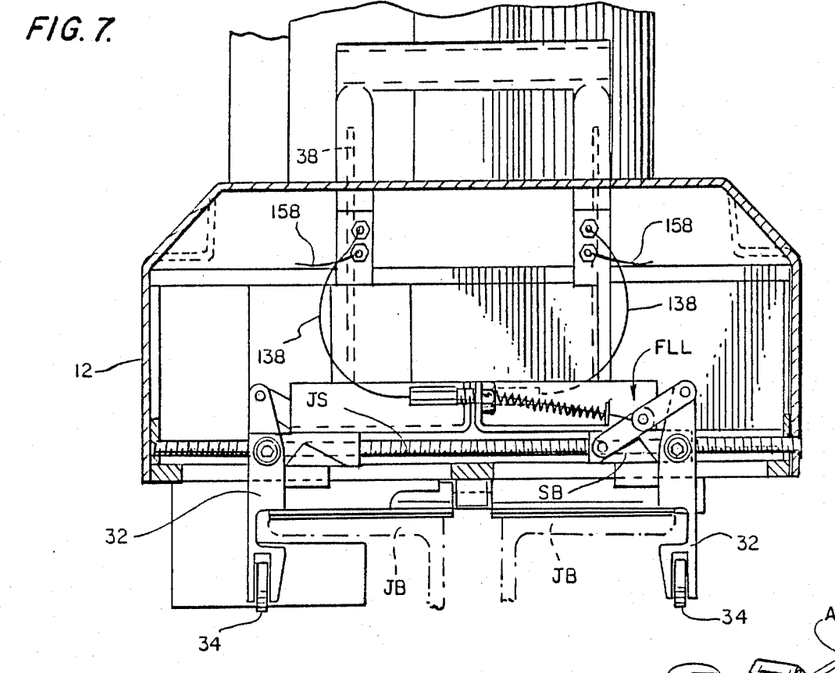
FIG. 7 is a vertical transverse cross-sectional view taken along line 7—7 of FIG. 1.
Figure 9:
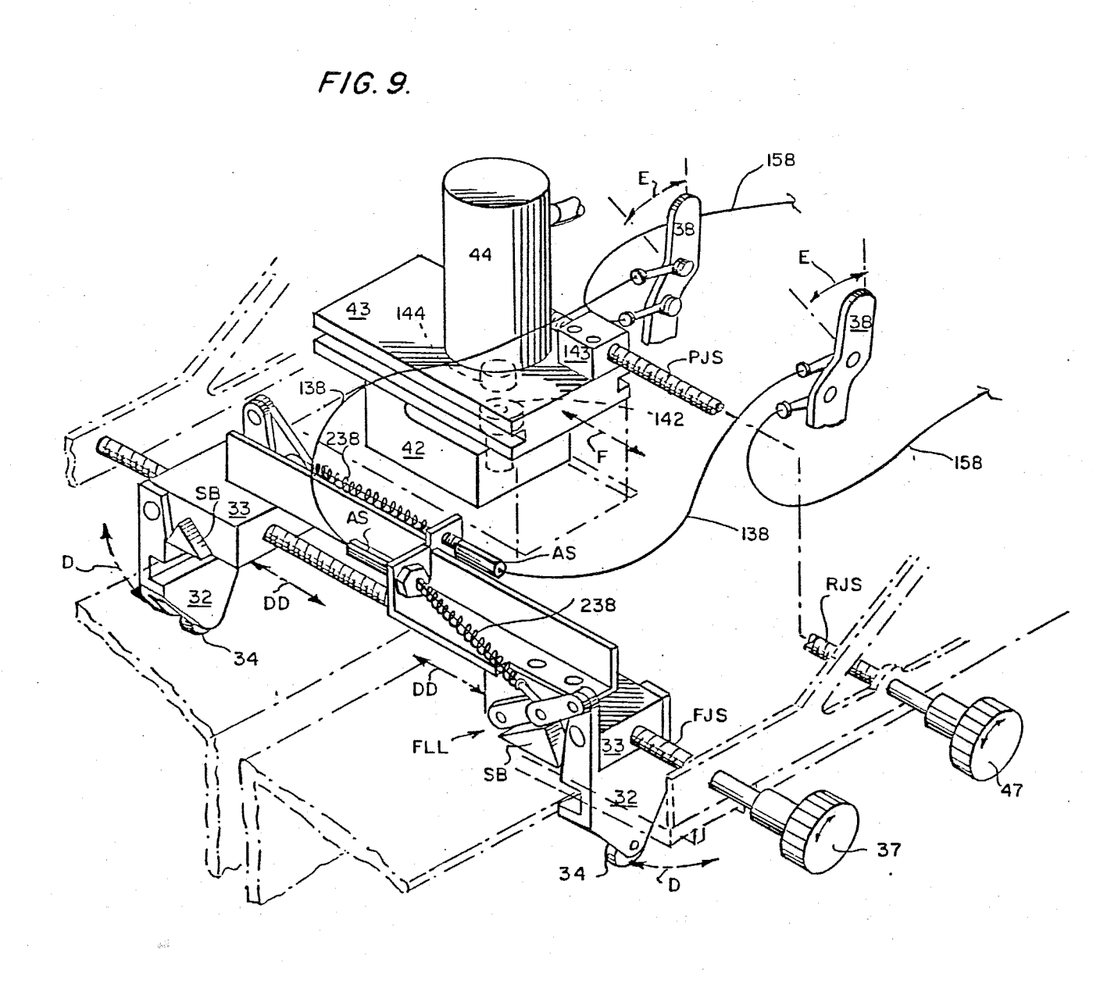
FIG. 9 is an exploded perspective of the adjustable front width guide, together with the adjustably mounted hydraulic punch cylinder.

At the front end of the housing are provided a pair of width guides. These width guides 32 have support blocks 33 which move respectively on the double threaded front jack screw FJS. As best seen in FIG. 6, one-half of the front jack screw is threaded in one direction, while the other half thereof is threaded in the opposite direction. Thus, when the jack screw knob 37 is rotated in one direction or the other, the blocks 33 will be moved inwardly or outwardly, as indicated by the arrows DD in FIG. 9. The width guide bodies 32 are pivotally mounted from these blocks 33 by appropriate pin supports. At the lower extremity of each width guide body 32 are rollers 34 which are freely pivotally mounted therefrom. Front lever linkage FLL is appropriately mounted to each of the width guide bodies 32 for actuation thereof by cables 138. When the respective levers 38 for the width guides are moved in the direction of the arrows E, the cables 138 will effect opening of the front width guides 32. Compression springs 238 supported between adjusting structures AS and the connection to the front linking levers FLL effect movement of these levers in the opposite direction to that of the cables 138. A stop block SB appropriately mounted in conjunction with the linking levers LL prevent their movement too far in the closing direction.

The rear width guide bodies 52 are similar to the ones 32 already described. An adjusting knob 57 rotates a double threaded rear jack screw RJS mounted transversely near the rear of housing 12. Transversely threaded blocks 53, similar to blocks 33 already described, similarly support width guide bodies 52 pivotally therefrom. Rear linking levers RLL are actuated by the cables 158 which also are connected to the width guide levers 38. Thus simultaneously with opening and closing of the front width guides 30, the rear width guides 50 are likewise opened and closed.

A front handle 19 mounted transversely across the forward portion of the housing 12 provides a convenient hand grip for an operator of the device. Likewise, a rear handle 68 which extends lengthwise along the centerline of the housing provides further gripping and support structure for an operator.

Figure 5:
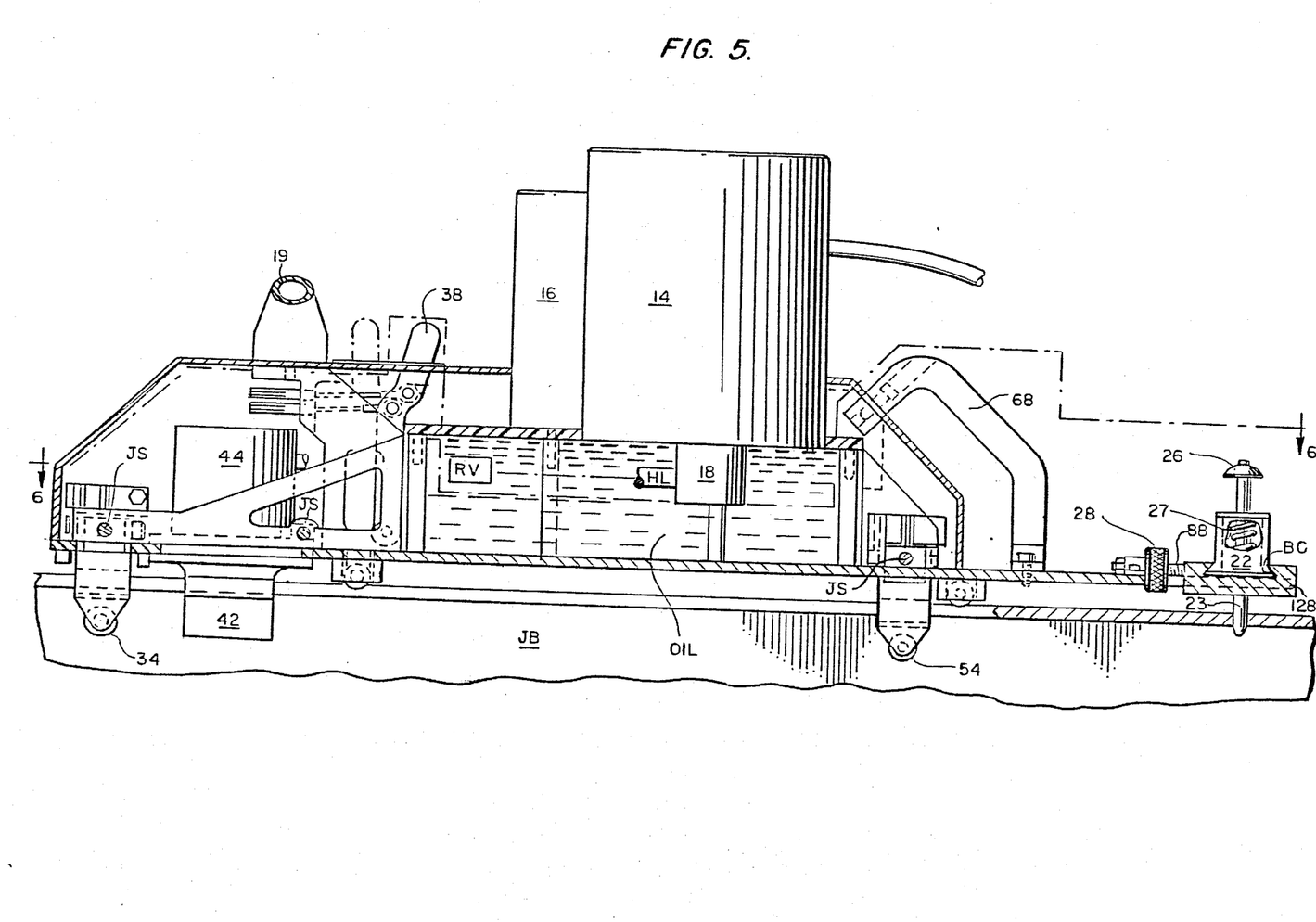
FIG. 5 is a vertical side cross-sectional view taken generally along line 5—5 of FIG. 4.

Mounted at the rear of the housing is the pin gauge structure 20. This consists of a body 22 supporting a pin 24 having a tapered pointed end 23 on the lower end thereof. A semi-circular curved handle 26 affixed to the top of pin 24 provides a convenient hand grip for a user. Within the body 22 is a compression spring 27 which normally biases the pointed end 23 in the down position. An adjusting knob 28 is used to operate a screw 88 to move the support block 128 forward or rearwardly of the housing. The body 22 of the gauge pin is mounted on the block 128 in a bevelled side slotted channel, as best seen in the cross-section of FIG. 5. Adjusting screws 51 are used to move the pin gauge housing 22 transversely of the housing 12.

Between the oil sump reservoir and the front of the housing is mounted the punch jack screw PJS with a handle 47 affixed thereto. A block 43 having guide slots GS on either side thereof is suitably supported from the housing for movement transversely F of the housing 12. Rotation of the punch jack screw PJS in the pillow block 143 is affixed to the support block 43 in conventional manner.

Figure 10:
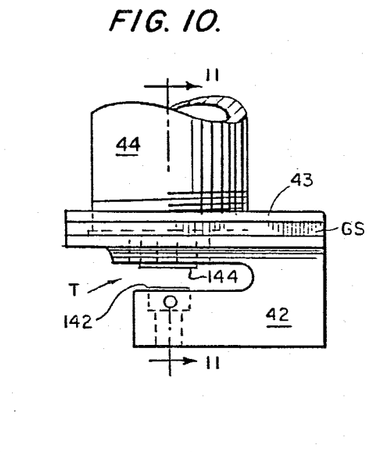
FIG. 10 is a fragmentary side view of the punch assembly per se.
Figure 11:
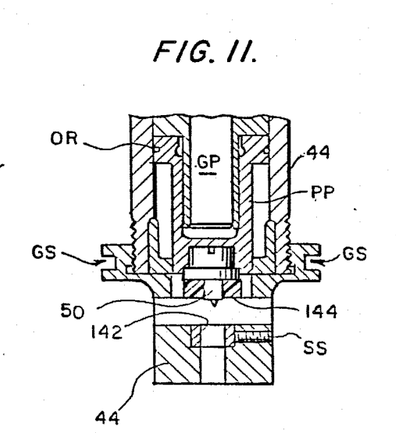
FIG. 11 is a vertical cross-sectional view taken generally along line 11—11 of FIG. 10.

Looking at FIGS. 10 and 11 of the drawings, the hydraulic punch 44, together with the support block 43 and the anvil structure 42 mounted therebelow, can be seen in detail. The anvil block 42 has a throat T for access to a plastic tripper 144 mounted on the lower end of the hydraulic punch cylinder 44. As best seen in FIG. 11, the hydraulic punch cylinder 44 has a punch piston PP supported for vertical movement therewithin and an oil ring OR for maintaining and preventing oil leakage past the piston head PP. A guide pin GP mounted from the top of the hydraulic punch 44 maintains alignment of the punch during operation thereof. At the lower end of this structure a metal punch 50 is shown. The lower portion of anvil 42 has a die 142 held in place by a set screw SS. In normal operation of the joist runner, the flange or edge of the joist beam JB passes or moves through the throat T of this structure, and when the hydraulic punch 44 is activated, the punch 50 will suitably form a hole through the desired portion of the flange of the joist beam. Of course, knob 47 is used initially to suitably position the punch structure along the desired line for the holes to be spaced and punched.

The method of erecting and installing a roof panel structure on a bar joist using the joist run of the present invention will now be described in detail. Preferably, MR-24 TM roof panels are being installed upon the building under construction. Assuming the building has been erected and the roof joists are in place, and the initial layout and squaring procedures have been completed, lines are located on the bar joists for the hole locations which are to be punched by the joist runner. Then a 5/16" diameter hole is drilled at the point ascertained for the first pilot hole. The hole should be drilled on the same side that the joist runner punches, i.e., the righthand side looking toward the punching direction. Mount the joist runner upon the bar joist by opening the clamping guides and place the joist runner thereon. Locate the guide pin of the joist runner in the pre-drilled pilot hole. Then adjust the clamping guides, both front and rear, just tight enough to secure the tool, and loose enough for travel freely along the joist, taking into account the normal tolerance of the bar joist width. Then adjust the punch locating slide to position the punch in the center of the bar joist top angle. Note that enough seating area around the punch hole must be provided so that the MR-24 TM roof mounting clip can have a proper seating base therefor. Push the punch operating button and hold it until the punch penetrates the flange, then immediately release the button. Do not hold the button after the punch has penetrated the flange, as this only puts unnecessary strain on the pump and tool, and furthermore, wastes time. Pull the guide pin up and push the joist runner forward, relocating the guide pin in the just-punched hole. Continue the above operation for the remaining holes to be punched along the bar joist. Approximately every 10 feet or so verification should be made that the punched holes are spaced as desired. If any changes are occurring, proper adjustment of the gauge tool should be made so as to maintain the correct two feet spacing of the holes being punched. It should be noted that when encountering obstacles along the bar joist line, such as bracing, pipe hangers, and the like, it will be necessary to open the width guides, and perhaps even the punch locating slide to continue punching around these obstacles. Once the first bar joist has had the spaced holes punched therein, the operator returns the tool to the starting end wall and repeats the aforesaid operating procedures on the next joist line. Preferably, each operation occurs on the upslope of each bar joist. Of course, once the holes are punched, installation of the MR-24 TM roof panels can proceed as conventional. However, it is very important that the work crews use the pre-punched holes to maintain the panel modularity on every panel run.

It can be seen from the foregoing description that the joist runner and the punch apparatus of the present invention, as well as the method of installing roof panels using this tool, provides an improved apparatus and system over the method and tools formally used. The apparatus of the present invention gauges between holes utilizing the gauge pin in the previously punched holes and then punching the next hole approximately two feet further ahead. Then the operator manually pulls up the gauge pin and pushes the tool ahead to the next desired hole. By inserting the gauge pin in the hole just punched, the next hole to be punched is accurately gauged (two feet or the like) for punching thereof. By continuing this operation along the entire roof panel support beam or joist, a plurality of punched holes on two feet centers can be accurately obtained.

The tool is designed to punch a maximum hole size of 5/16" diameter through ⅛"-¼"thick high yield steel material, usually metal angles. The tool will accommodate 1½"×1½" to 3"×3" back-to-back angles with web members from ½" diameter to 1" diameter. The centering and locking mechanisms are designed to swing up out of the way from obstacles like bracing and the like. The guide pin has a fine adjustment to assure proper two foot spacing between the punched holes.

The tool and system of the present invention provides accurate punching with minimal additional costs, and properly spaced pre-punched holes for attaching the MR-24 TM roof system properly. A list of the benefits obtained by using the joist runner and system of the present invention is as follows:

1. Insures that the building constructor squares the structure properly.
2. Provides for accurate spacing dimensions between punched holes (modularity).
3. Assures a proper size hole.
4. Provides for fast installation with minimal additional labor.
5. No additional material costs are required, except perhaps at the eaves.
6. Reduces workman fatigue substantially as compared to conventional drilling.
7. Provides for maximum safety as compared to conventional drilling.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A method of providing a plurality of spaced holes in a roofed panel support member of a building under construction comprising the following steps:
    forming a first pilot hole at one end of the roof panel support member;
    mounting a portable hydraulic punch apparatus upon the roof panel support member, said apparatus having an adjustable guide structure for affixing the apparatus on a roof panel support member and for guiding the apparatus along the member;
    moving the apparatus along the support member until a gauge pin on the apparatus is located in the first pilot hole;
    adjusting the guide structure on the apparatus to accommodate the apparatus to the member;
    using punching structure of the portable punch apparatus for punching another hole a predetermined distance from the first one;
    removing the gauge pin from the first pilot hole, moving the apparatus along the roof panel support member and inserting the gauge pin in the punched hole to relocate the punch structure for forming another hole a predetermined distance from the preceding punched hole; and
    repeating the steps of relocating the gauge pin in the last punched hole and then punching a new hole in the roof panel support member to form a plurality of spaced holes along the member.

2. The method defined in claim 1, wherein hydraulic pressure is used with the portable punching apparatus for effecting the desired punching action, and further including maintaining a minimum level of hydraulic pressure in the system so that minimum recycling time of the hydraulic punch can be achieved.

3. The method defined in claim 1, including the further step of adjusting the gauge pin a predetermined distance from the punch structure so that repeatedly spaced distances between the plurality of holes can be achieved with very little error and can be adjusted.

4. The method defined in claim 1, including the step of:
    drilling said first pilot hole.

5. The method defined in claim 1, wherein the roof panel support member comprises an elongate joist having a width dimension, and the guide structure on the apparatus includes a width adjustment to fit the guide structure to the width of the joist, said method including the steps of:
    adjusting the width of the guide structure to fit the guide structure to the width of the joist.

* * * * *